United States Patent
Sun

(10) Patent No.: US 8,248,914 B2
(45) Date of Patent: Aug. 21, 2012

(54) GATEWAY DEVICE AND METHOD FOR MAINTAINING A COMMUNICATION CONNECTION THERETHROUGH

(75) Inventor: Chi-Jen Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 336 days.

(21) Appl. No.: 12/701,701

(22) Filed: Feb. 8, 2010

(65) Prior Publication Data

US 2011/0063984 A1    Mar. 17, 2011

(30) Foreign Application Priority Data

Sep. 11, 2009  (CN) .......................... 2009 1 0306875

(51) Int. Cl.
  *H04L 12/26* (2006.01)
(52) U.S. Cl. ........ 370/216; 370/219; 370/220; 370/242; 370/248; 370/252
(58) Field of Classification Search .......... 370/216–221, 370/235, 236, 237, 242–245, 250, 352, 353, 370/401
See application file for complete search history.

(56) References Cited

U.S. PATENT DOCUMENTS

| 2002/0188891 | A1* | 12/2002 | McBrearty et al. ............. 714/42 |
| 2008/0144489 | A1* | 6/2008 | Huang et al. .................. 370/216 |
| 2008/0240080 | A1* | 10/2008 | Patait ........................... 370/352 |
| 2009/0219822 | A1* | 9/2009 | Variyath et al. ............... 370/245 |

FOREIGN PATENT DOCUMENTS

CN  1829369  9/2006

* cited by examiner

*Primary Examiner* — Hassan Kizou

*Assistant Examiner* — Siming Liu

(74) *Attorney, Agent, or Firm* — Altis Law Group, Inc.

(57) ABSTRACT

A gateway device includes a VoIP (Voice over Internet Protocol) card, a standby VoIP card, and a VoIP control card communicating with the VoIP card and the standby VoIP card. Control of a current communication connection is switched from the VoIP card to the standby VoIP card by the VoIP control card when the VoIP card has failed to function. Control of the current communication connection is switched to the standby VoIP card allowing the standby VoIP card to maintain the current communication connection.

9 Claims, 3 Drawing Sheets

GATEWAY DEVICE AND METHOD FOR MAINTAINING A COMMUNICATION CONNECTION THERETHROUGH

BACKGROUND

1. Technical Field

Embodiments of the present disclosure generally relate to communication systems, and more particularly to a gateway device and method for maintaining a communication connection.

2. Description of Related Art

A gateway device, in telecommunications, is a network node device equipped for interfacing with another network that uses different Internet protocols. The gateway device may include a VoIP (Voice over Internet Protocol) card, and a VoIP control card.

However, a communication connection between the communication provider and the communication receiver, may be disconnected if the VoIP card of the gateway device fails to function. This gateway device is thus insecure, leading to disconnection of the communication connection.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, each "step" described above and below, is operative under the controlling of a corresponding "module". The word "module," as described herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
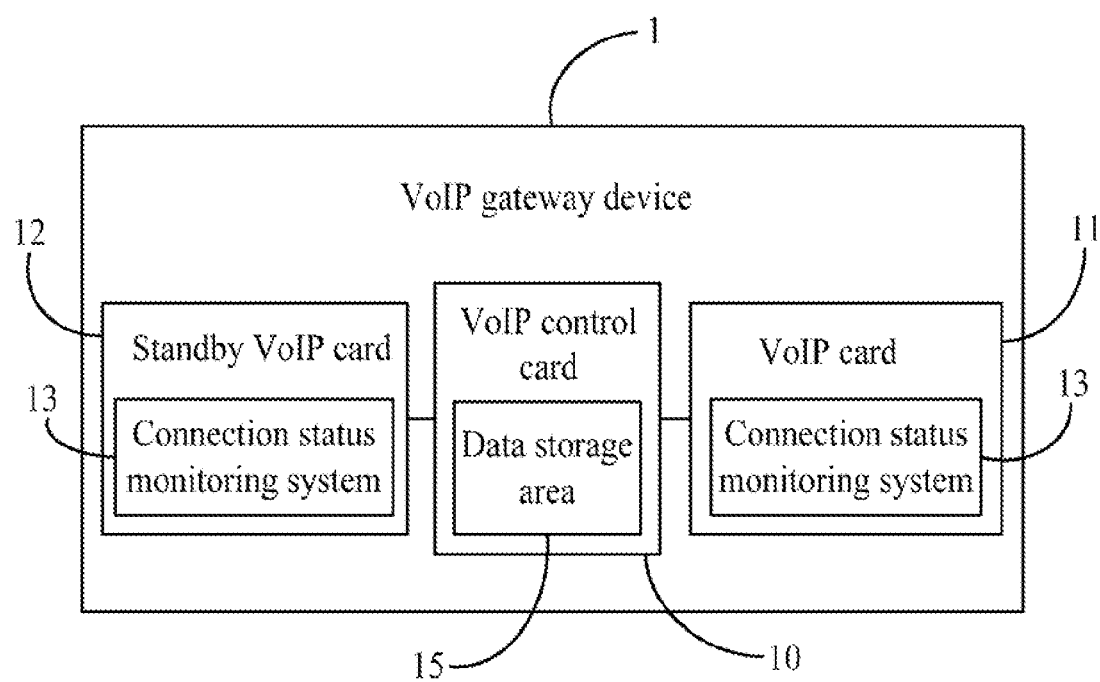
FIG. 1 is a block diagram of one embodiment of a VoIP gateway device for maintaining a communication connection.

FIG. 1 is a block diagram of one embodiment of a Voice over Internet Protocol (VoIP) gateway device 1. The VoIP gateway device 1 may include a VoIP card 11, a standby VoIP card 12, and a VoIP control card 10 in communication with the VoIP card 11 and the standby VoIP card 12. In the embodiment, the term "card" refers to a circuit board having data storage and processing capability, such as a TV card, a display card, or a network card. The VoIP card 11 compresses voice data provided from a communication provider (not shown in FIG. 1), and divides the compressed voice data into a plurality of voice data packets according to the Internet Protocol. Furthermore, the VoIP card 11 provides the plurality of voice data packets to the VoIP control card 10. The VoIP control card 10 provides the plurality of voice data packets to a communication receiver (not shown in FIG. 1) through the Internet.

In the embodiment, the standby VoIP card 12 maintains a communication connection controlled by the VoIP card 11, if the VoIP card 11 has failed to function. In the embodiment, the communication connection between the communication provider and the communication receiver is controlled by the VoIP card 11. A connection status monitoring system 13 is included in and executable by the standby VoIP card 12 and the VoIP card 11, to maintain the communication connection.

The VoIP control card 10 includes a data storage area 15 to store connection data of the VoIP card 11. In the embodiment, the connection data may include voice data of a current communication connection, a current communication connection status, a destination address of the voice data, and a source address of the voice data.

Figure 2:
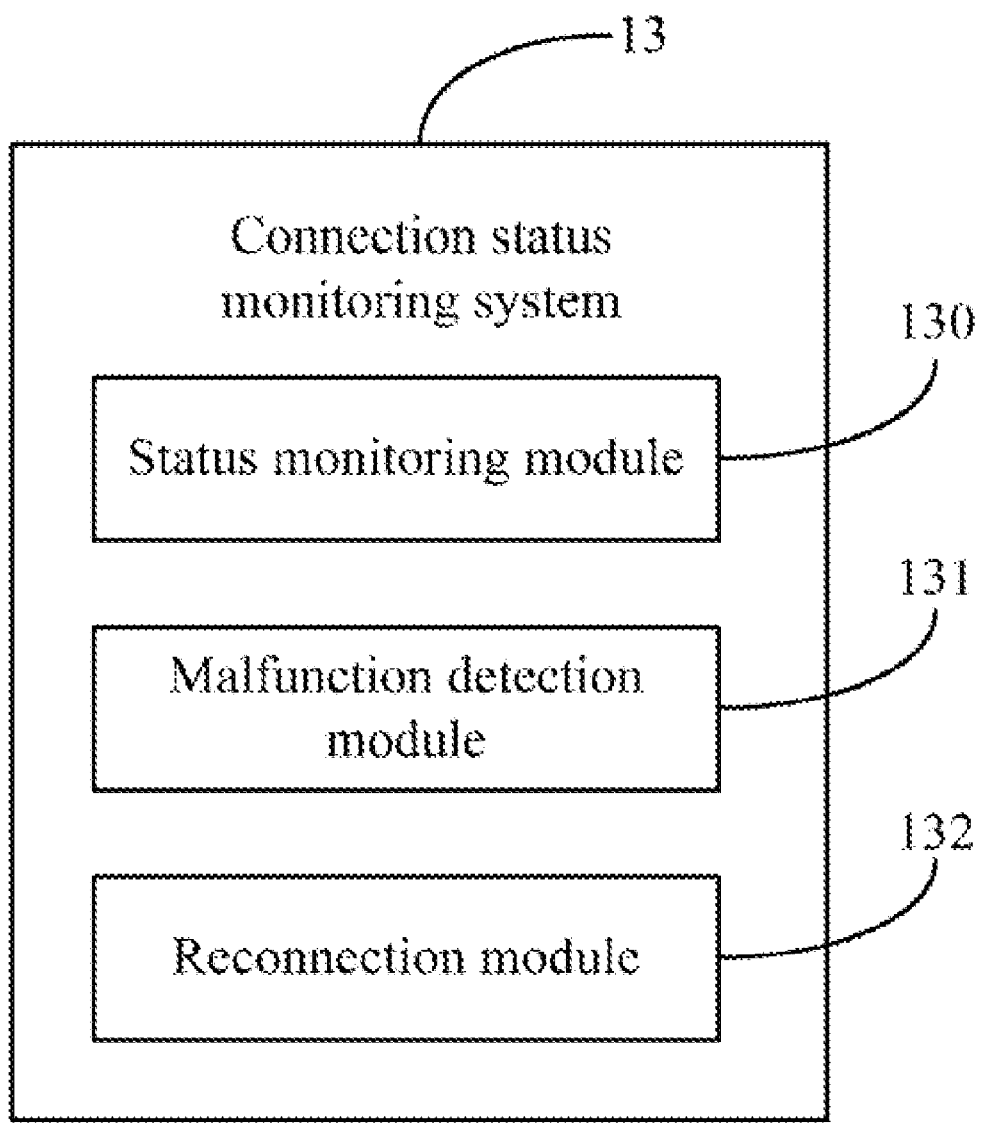
FIG. 2 is a block diagram of functional modules of a connection status monitoring system of FIG. 1.

FIG. 2 is a block diagram of functional modules of the connection status monitoring system 13. In the embodiment, the connection status monitoring system 13 includes a status monitoring module 130, a malfunction detection module 131, and a reconnection module 132.

The status monitoring module 130 monitors a current communication connection status of the VoIP card 11. In the embodiment, the current communication connection status is selected from the group consisting of a communication connection status, a communication disconnection status, and a communication connection waiting status.

The status monitoring module 130 further backs up connection data of the current communication connection to the data storage area 15 of the VoIP control card 10.

The malfunction detection module 131 determines whether the VoIP card 11 has failed to function. In the embodiment, the malfunction detection module 131 simulates voice data of the communication connection status, and provides the simulated voice data to the VoIP card 11. Furthermore, the malfunction detection module 131 directs the VoIP card 11 to provide the simulated voice data to the VoIP control card 10. In addition, the malfunction detection module 131 determines that the VoIP card 11 has failed to function if the simulated voice data is not received by the VoIP control card 10, or determine that the VoIP card 11 is functioning properly if the simulated voice data is received by the VoIP control card 10.

The VoIP control card 10 switches the control of the current communication connection from the VoIP card 11 to the standby VoIP card 12, if the VoIP card 11 has failed to function. The VoIP control card 10 further provides the backup connection data of the current communication connection to the standby VoIP card 12.

The reconnection module 132 directs the standby VoIP card 12 to rebuild the current communication connection according to the backup connection data, so as to maintain the current communication connection.

Figure 3:
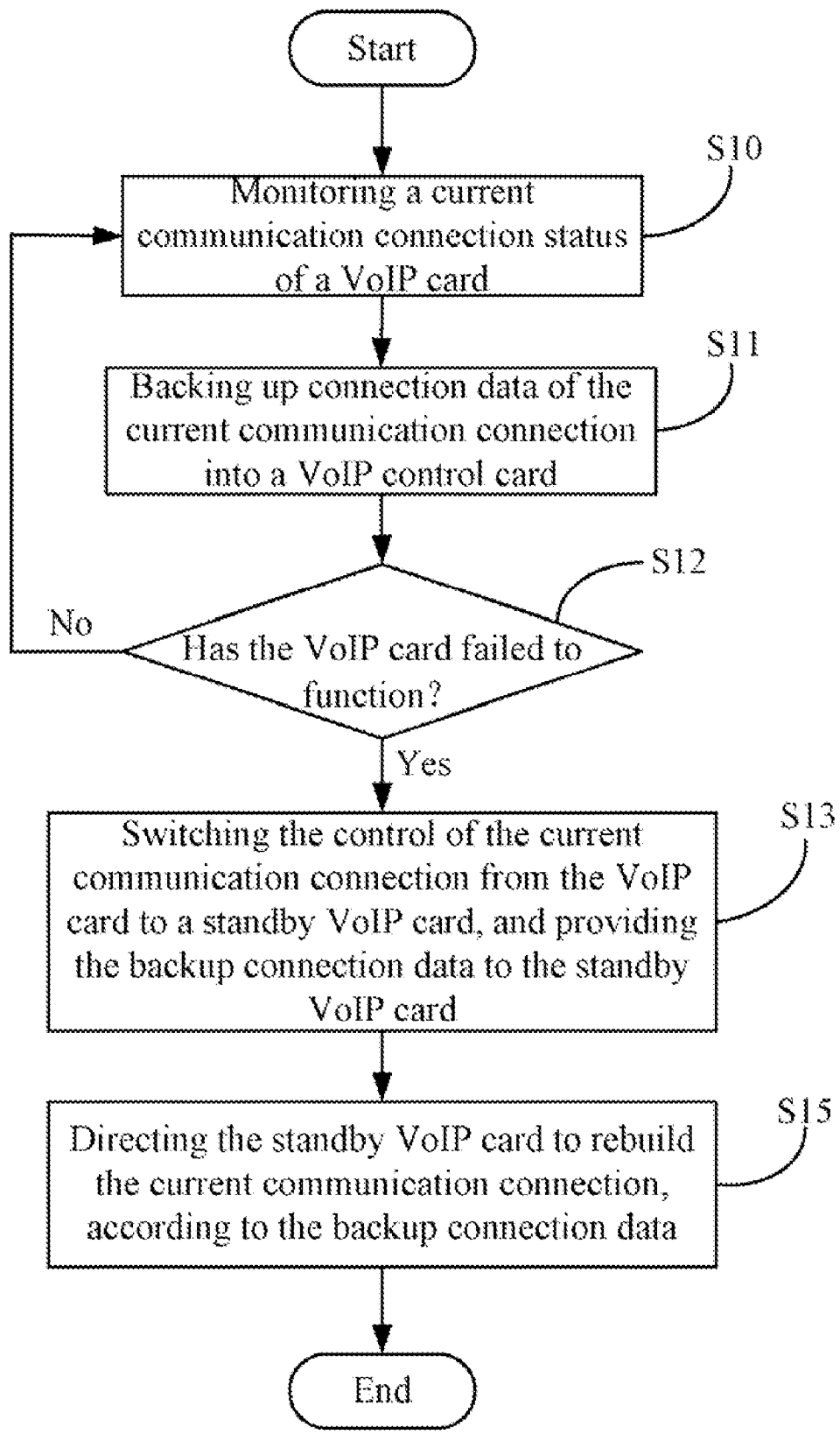
FIG. 3 is a flowchart illustrating one embodiment of a method for maintaining a communication connection used in a gateway device such as, for example, that of FIG. 1.

FIG. 3 is a flowchart illustrating one embodiment of a method for maintaining a communication connection used by a gateway device such as, for example, that of FIG. 1. In the embodiment, the connection status monitoring system 13 comprises one or more computerized codes that are executable by the VoIP card 11 and the standby VoIP card 12 to perform the method. Depending on the embodiment, additional blocks in the flow of FIG. 3 may be added, others removed, and the ordering of the blocks may be changed.

In block S10, the status monitoring module 130 of the VoIP card 11 monitors a current communication connection status of the VoIP card 11.

In block S11, the status monitoring module 130 of the VoIP card 11 backs up connection data of the current communication connection to the data storage area 15 of the VoIP control card 10.

In block S12, the malfunction detection module 131 of the VoIP card 11 determines whether the VoIP card 11 has failed to function.

If the VoIP card 11 has failed to function, block S13 is implemented. If the VoIP card 11 is functioning properly, block S10 is repeated.

In block S13, the VoIP control card 10 switches the control of the current communication connection from the VoIP card 11 to the standby VoIP card 12, and provides the backup connection data of the current communication connection to the standby VoIP card 12.

In block S15, the reconnection module 132 of the standby VoIP card 12 directs the standby VoIP card 12 to rebuild the current communication connection according to the backup connection data, so as to maintain the current communication connection.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A gateway device, comprising:
a VoIP (Voice over Internet Protocol) card, a standby VoIP card, and a VoIP control card in communication with the VoIP card and the standby VoIP card, each of the VoIP card and the standby VoIP card comprising a connection status monitoring system;
the connection status monitoring system of the VoIP card operable to:
monitor a current communication connection status of the VoIP card, and back up connection data of a current communication connection to the VoIP control card; and
simulate voice data of the current communication connection status, provide the simulated voice data to the VoIP card, and direct the VoIP card to provide the simulated voice data to the VoIP control card to determine whether the VoIP card has failed to function;
the VoIP control card operable to switch control of the current communication connection from the VoIP card to the standby VoIP card, and provide the backup connection data of the current communication connection to the standby VoIP card;
the connection status monitoring system of the standby VoIP card operable to rebuild the current communication connection according to the backup connection data.

2. The gateway device as described in claim 1, wherein the current communication connection status is selected from the group consisting of a communication connection status, a communication disconnection status, and a communication connection waiting status.

3. The gateway device as described in claim 2, wherein
the VoIP card is determined as failed to function when the simulated voice data is not received by the VoIP control card; and
the VoIP card is determined as functioning properly when the simulated voice data is received by the VoIP control card.

4. A method for maintaining a communication connection through a gateway device, the method comprising:
monitoring a current communication connection status of a VoIP card of the gateway device;
backing up connection data of a current communication connection to a VoIP control card of the gateway device;
simulating voice data of a communication connection status, providing the simulated voice data to the VoIP card, and directing the VoIP card to provide the simulated voice data to the VoIP control card to determine whether the VoIP card has failed to function;
switching the control of the current communication connection from the VoIP card to a standby VoIP card of the gateway device by the VoIP control card, when the VoIP card has failed to function;
providing the backup connection data of the current communication connection to the standby VoIP card; and
directing the standby VoIP card to rebuild the current communication connection according to the backup connection data.

5. The method as described in claim 4, wherein the current communication connection status is selected from the group consisting of a communication connection status, a communication disconnection status, and a communication connection waiting status.

6. The method as described in claim 5, wherein
the VoIP card is determined as failed to function when the simulated voice data is not received by the VoIP control card; and
the VoIP card is determined as functioning properly when the simulated voice data is received by the VoIP control card.

7. A non-transitory computer storage medium having stored thereon instructions that, when executed by a processor of a gateway device, causing the gateway device to perform a method for maintaining a communication connection, wherein the method comprises:
monitoring a current communication connection status of a VoIP card of the gateway device;
backing up connection data of a current communication connection to a VoIP control card of the gateway device;
simulating voice data of a communication connection status, providing the simulated voice data to the VoIP card, and directing the VoIP card to provide the simulated voice data to the VoIP control card to determine whether the VoIP card has failed to function;
switching the control of the current communication connection from the VoIP card to a standby VoIP card of the gateway device by the VoIP control card when the VoIP card has failed to function;
providing the backup connection data of the current communication connection to the standby VoIP card; and
directing the standby VoIP card to rebuild the current communication connection according to the backup connection data, so as to maintain the current communication connection.

8. The storage medium as described in claim 7, wherein the current communication connection status is selected from the group consisting of a communication connection status, a communication disconnection status, and a communication connection waiting status.

9. The storage medium as described in claim 8, wherein
the VoIP card is determined as failed to function when the simulated voice data is not received by the VoIP control card; and
the VoIP card is determined as functioning properly when the simulated voice data is received by the VoIP control card.

* * * * *